(12) United States Patent
Yoo et al.

(10) Patent No.: US 11,458,927 B2
(45) Date of Patent: Oct. 4, 2022

(54) IN-VEHICLE PAYMENT SYSTEM AND METHOD FOR GENERATING AUTHORIZATION INFORMATION USING THE SAME

(71) Applicants: HYUNDAI MOTOR COMPANY, Seoul (KR); KIA MOTORS CORPORATION, Seoul (KR)

(72) Inventors: Ki Tag Yoo, Gwangmyeong-si (KR); Sang Jun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 126 days.

(21) Appl. No.: 17/016,750

(22) Filed: Sep. 10, 2020

(65) Prior Publication Data

US 2021/0162947 A1    Jun. 3, 2021

(30) Foreign Application Priority Data

Dec. 3, 2019   (KR) .................. 10-2019-0159272

(51) Int. Cl.
   *B60R 25/20*   (2013.01)
   *B60R 25/22*   (2013.01)
   *G06Q 20/40*   (2012.01)

(52) U.S. Cl.
   CPC .......... *B60R 25/2081* (2013.01); *B60R 25/22* (2013.01); *G06Q 20/4012* (2013.01); *G06Q 20/4093* (2013.01)

(58) Field of Classification Search
   CPC ................ B60R 25/2081; B60R 25/22; G06Q 20/4012; G06Q 20/4093
   See application file for complete search history.

(56) References Cited

U.S. PATENT DOCUMENTS 4,664,127 A * 5/1987 Ikeyama ............ A61B 5/02416
                                                 600/502
6,556,149 B1 * 4/2003 Reimer .............. H03K 17/9631
                                                 250/227.21

(Continued)

FOREIGN PATENT DOCUMENTS

KR             101595339 B      2/2016

*Primary Examiner* — Nay Tun
(74) *Attorney, Agent, or Firm* — Morgan, Lewis & Bockius LLP

(57) ABSTRACT

An in-vehicle payment system and a method for generating authorization information using the same are provided. The in-vehicle payment system includes an authentication number input device including an interface of a vehicle configured to receive an input from a user, and generate and output input signals corresponding to a manipulation pattern of the interface, a code display device configured to display a code table in an array form including a plurality of code values based on received code information on a screen, and an authorization information generator configured to generate the code information and transmit the code information to the code display device, and recognize an authentication number input by the user using the code information and preset matching information to generate authorization information corresponding to the authentication number when the input signals are received from an authentication number input device.

14 Claims, 5 Drawing Sheets

(56) References Cited

U.S. PATENT DOCUMENTS

| | | | | |
|---|---|---|---|---|
| 8,406,961 B2* | 3/2013 | Pathak | G06F 3/03547 | 701/48 |
| 8,994,495 B2 | 3/2015 | Dassanayake | G07C 9/00174 | 340/5.23 |
| 9,159,221 B1* | 10/2015 | Stantchev | G08C 17/02 | |
| 10,077,576 B1* | 9/2018 | Salter | B60R 25/23 | |
| 10,137,857 B1* | 11/2018 | Siddiqui | B60R 25/255 | |
| 10,279,659 B2* | 5/2019 | Salter | F21V 9/30 | |
| 10,332,104 B2* | 6/2019 | Prakash | G06Q 20/3674 | |
| 10,434,986 B1* | 10/2019 | Gilbert-Eyres | B60R 25/209 | |
| 10,769,874 B2* | 9/2020 | Salter | B60R 25/23 | |
| 10,778,223 B2* | 9/2020 | Salter | B60Q 3/43 | |
| 10,850,711 B2* | 12/2020 | Salter | B60R 11/0264 | |
| 10,949,830 B1* | 3/2021 | Gaudin | G06Q 20/3226 | |
| 11,244,298 B2* | 2/2022 | Zou | G06V 40/1365 | |
| 2002/0068605 A1* | 6/2002 | Stanley | H04M 1/0202 | 455/566 |
| 2003/0034903 A1* | 2/2003 | Levin | G06F 3/0219 | 341/20 |
| 2006/0145825 A1* | 7/2006 | Mc Call | B60R 25/2045 | 340/426.35 |
| 2007/0100523 A1* | 5/2007 | Trachte | G06F 3/04886 | 701/41 |
| 2010/0315267 A1* | 12/2010 | Chung | H03K 17/9622 | 341/22 |
| 2011/0090097 A1* | 4/2011 | Beshke | G06F 3/0488 | 341/20 |
| 2011/0169750 A1* | 7/2011 | Pivonka | G06F 3/04883 | 345/173 |
| 2014/0015637 A1* | 1/2014 | Dassanayake | G07C 9/00174 | 340/5.54 |
| 2015/0100498 A1* | 4/2015 | Edwards | G06Q 20/20 | 705/72 |
| 2015/0127493 A1* | 5/2015 | Winkelman | G06Q 20/3224 | 705/26.81 |
| 2015/0220916 A1* | 8/2015 | Prakash | G06Q 20/40 | 705/41 |

\* cited by examiner

IN-VEHICLE PAYMENT SYSTEM AND METHOD FOR GENERATING AUTHORIZATION INFORMATION USING THE SAME

CROSS-REFERENCE TO RELATED APPLICATION

The present application claims priority to and the benefit of Korean Patent Application No. 10-2019-0159272, filed on Dec. 3, 2019, the entire contents of which are incorporated herein by reference.

TECHNICAL FIELD

The present disclosure relates to an in-vehicle payment system and a method for generating authorization information using the same.

BACKGROUND

The statements in this section merely provide background information related to the present disclosure and may not constitute prior art.

Shops offering services that allow customers to order products while boarding a vehicle, such as a drive-through service, are increasing.

In addition, recently, a telematics device is mounted on the vehicle to provide mobile office implementation, an e-mail service, and the like using wireless internet, in addition to a vehicle location information service, vehicle theft and accident detection, remote vehicle diagnosis, emergency rescue, and a traffic information service. Telematics, which is a compound word of telecommunication and information science, means a combination of the vehicle and a mobile communication technology, and refers to providing a location information-based safety service required for the vehicle, a productivity enhancement service through office environment provision, and financial, reservation, product purchase, and other personalized services based on the mobile communication and internet technology.

An e-commerce function, such as paying for fuel cost or parking cost while a driver is in the vehicle using an AVNT (Audio/Video/Navigation/Telematics) device mounted in the vehicle or by accessing an Internet has been applied to the vehicle with such advance in the telematics technology.

However, the driver may feel uncomfortable because personal information is exposed on the screen of the AVNT or the input method is cumbersome.

SUMMARY

An aspect of the present disclosure provides a system and a method that allows a user to more easily and safely generate authorization information when paying for a product or a service while in a vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an in-vehicle payment system includes an authentication number input device including an interface of a vehicle allowing input by a user, and generating and outputting input signals corresponding to a manipulation pattern of the interface, a code display device for displaying a code table in an array form including a plurality of code values based on received code information on a screen, and an authorization information generator that generates the code information and transmit the code information to the code display device, and recognizes an authentication number input by the user using the code information and preset matching information to generate authorization information corresponding to the authentication number when the input signals are received from an authentication number input device.

According to another aspect of the present disclosure, a method for generating authorization information of a vehicle includes displaying a code table in an array form including a plurality of code values on a screen, when an interface of the vehicle allowing input by a user is manipulated, generating input signals corresponding to a manipulation pattern of the corresponding interface, and finding code values respectively corresponding to the input signals using previously stored code information and matching information to recognize the corresponding code values as an authentication number input by the user.

DRAWINGS

The above and other objects, features and advantages of the present disclosure will be more apparent from the following detailed description taken in conjunction with the accompanying drawings.

Figure 1:
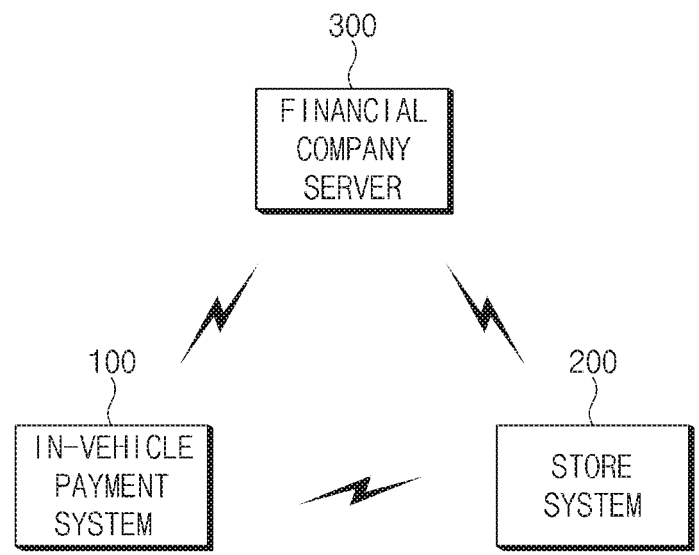
FIG. 1 is a view schematically illustrating a structure of a payment service system using an in-vehicle payment system.

The drawings described herein are for illustration purposes only and are not intended to limit the scope of the present disclosure in any way.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

FIG. 1 is a view schematically illustrating a structure of a payment service system using an in-vehicle payment system.

Referring to FIG. 1, a payment service system may include an in-vehicle payment system 100, a store system 200, and a financial company server 300.

The in-vehicle payment system 100 may be installed in a vehicle, and may perform communication with the store system 200 and the financial company server 300 to order a product or a service provided by a store and perform payment for the ordered product or service. The in-vehicle payment system 100 may include an Audio/Video/Navigation/Telematics (AVNT) device installed in the vehicle.

Such in-vehicle payment system 100 may provide order information and vehicle information to the store system 200. In addition, the in-vehicle payment system 100 may provide payment information including authorization information to the financial company server 300 for payment for service use or a product. In this connection, the authorization information may include information required to authenticate the payment, such as security card information, accredited certificate information, PIN code information, and the like. The payment information may include information required for performing charge payment, such as product or service charge information, card information, and the like.

In particular, the in-vehicle payment system 100 according to the present embodiment allows a user to input the authorization information using a code table displayed randomly on a cluster screen and control keys arranged on a steering wheel for secure input of the authorization information. A method for inputting the authorization information using such in-vehicle payment system 100 will be described later in detail.

The store system 200, which is a system that is operated in a store that provides a user-desired product or service, may be provided to be able to communicate with the in-vehicle payment system 100 and the financial company server 300. When order request information is received from the in-vehicle payment system 100, the store system 200 may transmit a payment approval request message to the financial company server 300, and receive payment approval information from the financial company server 300.

When the vehicle enters the store, the store system 200 may collect information of the entered vehicle or receive the vehicle information, the order information, and the like from the in-vehicle payment system 100 of the vehicle. For example, the store system 200 may transmit the entered vehicle information including the charge information on the use of the service to the in-vehicle payment system 100 of the entered vehicle.

The financial company server 300 may be provided to enable wireless communication with the in-vehicle payment system 100 and the store system 200. Such financial company server 300 may include a server provided in a card company, a bank, a securities company, and the like. When the payment information including the authorization information is received from the in-vehicle payment system 100, the financial company server 300 may identify the authorization information, and transmit the payment approval information to the in-vehicle payment system 100 as a response signal for the authorization information. In addition, the financial company server 300 may receive the payment approval request information from the store system 200, and transmit the payment approval information for the corresponding vehicle to the store system 200.

Figure 2:
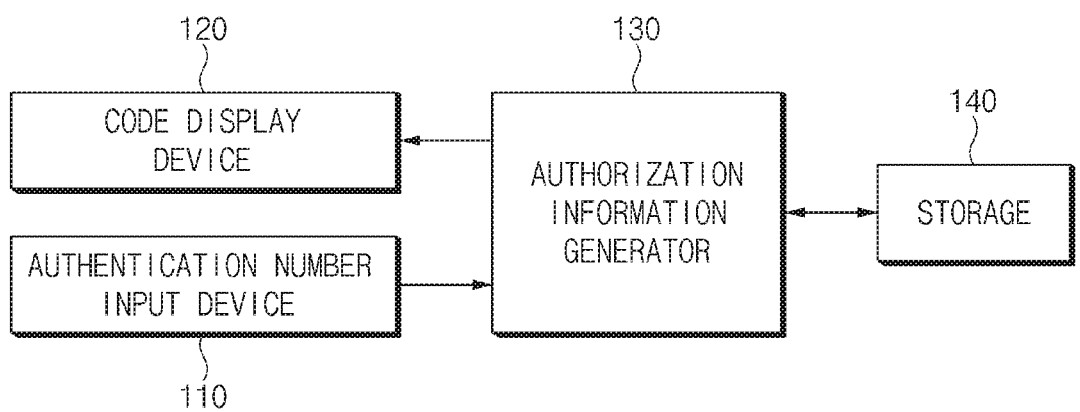
FIG. 2 is a block diagram illustrating components of an in-vehicle payment system of FIG. 1.

FIG. 2 is a block diagram illustrating components of an in-vehicle payment system of FIG. 1.

The present technology is characterized in a method for generating the authorization information for the payment in the vehicle. Therefore, a following description focuses on the method for generating the authorization information by the in-vehicle payment system. A method for performing the payment using the authorization information generated according to the present embodiment may be performed in the same manner as conventional payment methods.

Referring to FIG. 2, the in-vehicle payment system 100 may include an authentication number input device 110, a code display device 120, an authorization information generator 130, and storage 140.

The authentication number input device 110 includes a plurality of control keys (buttons), and when the user manipulates a specific control key, generates key signals (input signals) corresponding to an operation behavior (operation pattern) and transmits the generated key signals (input signals) to the authorization information generator 130. The authentication number input device 110 in the present embodiment may be formed on the steering wheel of the vehicle. For example, when the user manipulates preset some control keys among the control keys arranged on the steering wheel, the steering wheel may generate key signals corresponding to a manipulation direction of the corresponding control keys, and transmit the generated key signals to the authorization information generator 130.

That is, in the present embodiment, the user may input an authentication number required for the payment using the control keys arranged on the steering wheel. Moreover, in the present embodiment, separate control keys (or buttons) for the authentication may not be additionally formed on the steering wheel, and the user may input the authentication number using the control keys (or buttons) formed by default on the steering wheel.

A key signal generated by the steering wheel in an authentication mode may be the same signal as the key signal generated when the user manipulates the corresponding control key while the vehicle travels. Alternatively, a separate key signal used only in the authentication mode may be assigned to control keys used for user authentication on the steering wheel.

A method for inputting the authorization information using the steering wheel in the present embodiment will be described in detail below.

The code display device 120 displays, on a screen, a code table required for inputting the authentication number based on code information from the authorization information generator 130. The code display device 120 in the present embodiment may include a cluster of the vehicle. For example, the code display device 120 may display, on a central portion of a screen of the cluster, the code table required for inputting the authentication number in a form of arranged numbers (e.g., a matrix form). In this connection, a value (a code value) of each element (each matrix element) of the code table in the matrix form may be changed randomly under control of the authorization information generator 130 without having a fixed value. For example, the value of each element included in the code table may be changed randomly every time the authentication is performed.

The authorization information generator 130 generates the code information including the code value of each element in the code table to be displayed on the code display device 120, and transmits the code information to the code display device 120. In this connection, the authorization information generator 130 may generate the code information such that the code value of each element changes randomly every time the authentication is performed. The authorization information generator 130 may temporarily store the code information transmitted to the code display device 120 in the storage 140. That is, the authorization information generator 130 may respectively match the randomly and newly generated code values to corresponding elements in the code table, and temporarily store the matched code values in the storage 140.

In addition, when the key signal is received from the authentication number input device 110, the authorization information generator 130 recognizes the authentication number input by the user using the code information and matching information stored in the storage 140, and generates the authorization information corresponding to the recognized authentication number. In this connection, the matching information may include information about one-to-one matching of the key signals from the authentication number input device 110 and the elements in the code table. For example, when the key signal is input from the steering wheel, the authorization information generator 130 may use the matching information stored in the storage 140 to identify which element in the code table the key signal corresponds to, and then identify a code value of the corresponding element from the code information, thereby recognizing the authentication number input by the user.

The storage 140 stores the code information randomly generated by the authorization information generator 130 and the matching information between the code information and the key signals. For example, the code information may include information about the code table. That is, the code information may include information indicating how the code values randomly generated by the authorization information generator 130 are respectively allocated to the elements in the code table. In addition, the matching information may include information indicating a connection relationship between the key signals generated by the steering wheel and the elements in the code table included in the code information. That is, the matching information may include information indicating which element among eight elements in the code table the key signal generated by the steering wheel matches.

In FIG. 2, the storage 140 is represented as a separate component from the authorization information generator 130, but the storage 140 may be formed in a register form in the authorization information generator 130 to store the code information and the matching information.

Figure 3:
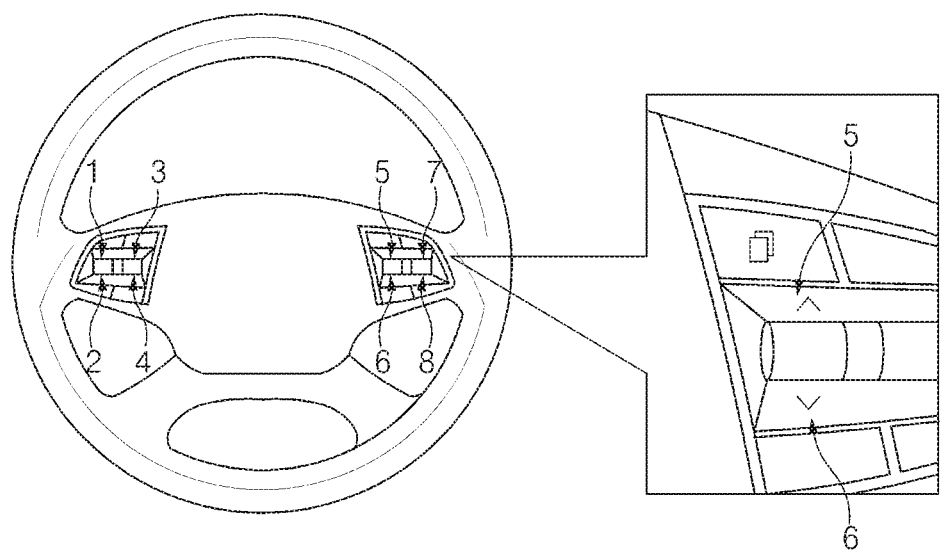
FIG. 3 is an exemplary view of an authentication number input device in FIG. 2.
Figure 4:
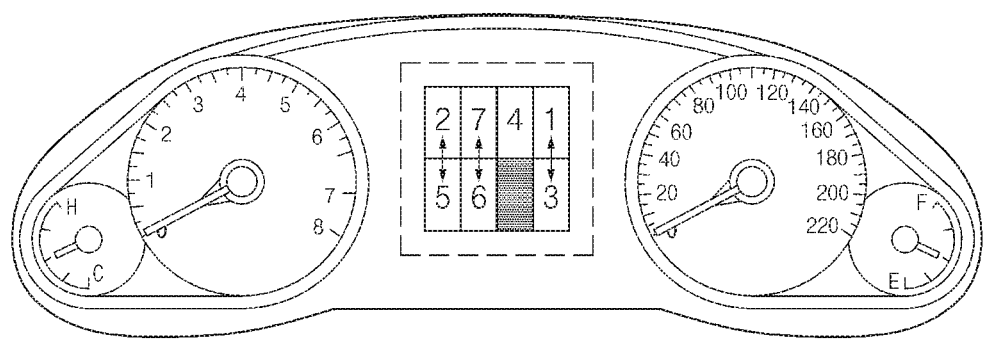
FIG. 4 is an exemplary view of a code display device in FIG. 2.

FIG. 3 is an exemplary view of an authentication number input device in FIG. 2. Further, FIG. 4 is an exemplary view of a code display device in FIG. 2.

First, referring to FIG. 3, the authentication number input device 110 may include the plurality of control keys for controlling functions of the vehicle on the steering wheel. For example, the authentication number input device 110 may include the plurality of control keys, which are arranged in a row in a horizontal direction on the steering wheel, and each of which may be manipulated in a vertical direction. In addition, a plurality of left control keys may be arranged symmetrically with a plurality of right control keys around a central portion of the steering wheel. The plurality of control keys may include a control key that controls a volume on the steering wheel (hereinafter, referred to as a 'volume control key'), a control key for changing broadcast channels/songs/files while using an AV (Audio/Video) function (hereinafter, referred to as a 'moving control key'), a control key for setting a cluster screen mode (hereinafter, referred to as a 'User Interface (UI) control key'), and a control key for controlling (RES+/RES−) a cruise speed (hereinafter, referred to as a 'cruise control key').

When the plurality of control keys (e.g., the volume control key, the moving control key, the UI control key, and the cruise control key) are manipulated upwardly or downwardly, the steering wheel, which is the authentication number input device 110, may generate each key signal corresponding to each case, and transmit the generated key signal to the authorization information generator 130. Hereinafter, for convenience of description, the steering wheel will be described with the same reference numeral as the authentication number input device 110.

For example, when the volume control key, which is a leftmost control key, among the plurality of control keys is manipulated upwardly, the steering wheel 110 generates a first key signal '1' and transmits the first key signal '1' to the authorization information generator 130. On the contrary, when the volume control key is manipulated downwardly, the steering wheel 110 generates a second key signal '2' and transmits the second key signal '2' to the authorization information generator 130.

In addition, when the moving control key, which is a control key immediately right to the volume control key, among the plurality of control keys is manipulated upwardly, the steering wheel 110 generates a third key signal '3' and transmits the third key signal '3' to the authorization information generator 130. On the contrary, when the moving control key is manipulated downwardly, the steering wheel 110 generates a fourth key signal '4' and transmits the fourth key signal '4' to the authorization information generator 130.

In addition, when the UI control key, which is a control key immediately right to the moving control key, among the plurality of control keys is manipulated upwardly, the steering wheel 110 generates a fifth key signal '5' and transmits the fifth key signal '5' to the authorization information generator 130. On the contrary, when the UI control key is manipulated downwardly, the steering wheel 110 generates a sixth key signal '6' and transmits the sixth key signal '6' to the authorization information generator 130.

In addition, when the cruise control key, which is a control key immediately right to the UI control key, among the plurality of control keys is manipulated upwardly, the steering wheel 110 generates a seventh key signal '7' and transmits the seventh key signal '7' to the authorization information generator 130. On the contrary, when the cruise control key is manipulated downwardly, the steering wheel 110 generates an eighth key signal '8' and transmits the eighth key signal '8' to the authorization information generator 130.

Next, referring to FIG. 4, the code display device 120 may include the cluster that is a vehicle instrument panel displaying the information about the vehicle. The code display device 120 may display a code table in a 2 rows×4 columns matrix form on the central portion of the cluster screen like a portion marked with a dotted line in FIG. 4, based on the code information from authorization information generator 130.

In the code table of such 2×4 matrix, each element is one-to-one matched with each of the first to eighth key signals 1 to 8 generated by the steering wheel 110.

For example, in the code table of the 2×4 matrix, an element (1,1) may match the first key signal '1', and an element (2,1) may match the second key signal '2'. In addition, an element (1,2) may match the third key signal '3', and an element (2,2) may match the fourth key signal '4'. In addition, an element (1,3) may match the fifth key signal "5", and an element (2,3) may match the sixth key signal '6'. In addition, an element (1,4) may match the seventh key signal '7', and an element (2,4) may match the eighth key signal '8'. When it is necessary, some of the elements in the code table may be locked so as not to be used. In the present embodiment, the element (2,3) is marked as being locked and not used. Such matching information may be stored in advance in the storage 140.

In this connection, the user knows which control key should be controlled and how to control the control key to input a code value of a specific element, rather than knowing which element corresponds to which key signal in the code table. This may be found in a manual provided when purchasing the vehicle.

For example, the user knows that the volume control key should be manipulated upwardly to input the code value of the element (1,1), and the volume control key should be manipulated downwardly to input the code value of the element (2,1). In addition, the user knows that the moving control key should be manipulated upwardly to input the code value of the element (2,1), and the moving control key should be manipulated downwardly to input the code value of the element (2,2). Similarly, the user knows that the UI control key or the cruise control key should be manipulated upwardly or downwardly to input the code value of the element (1,3), (2,3), (1,4), or (2,4).

In the present embodiment, the case in which the four control keys arranged in the horizontal direction on the steering wheel and being able to be manipulated in the vertical direction are used has been described as an example. Accordingly, the case in which the code table is formed in the 2×4 matrix form has been described as an example. In this case, the authentication number may be input using up to eight numbers.

However, depending on a type of the steering wheel, the user may input the authentication number using five control keys, and using all ten numbers 0 to 9. In such a case, the code table may be displayed in a 2×5 matrix form.

In addition, in FIG. 3, the four control keys (the volume control key, the moving control key, the UI control key, and the cruise control key) arranged side by side in the row on the steering wheel are used, but other control keys provided on the steering wheel may be used.

Figure 5:
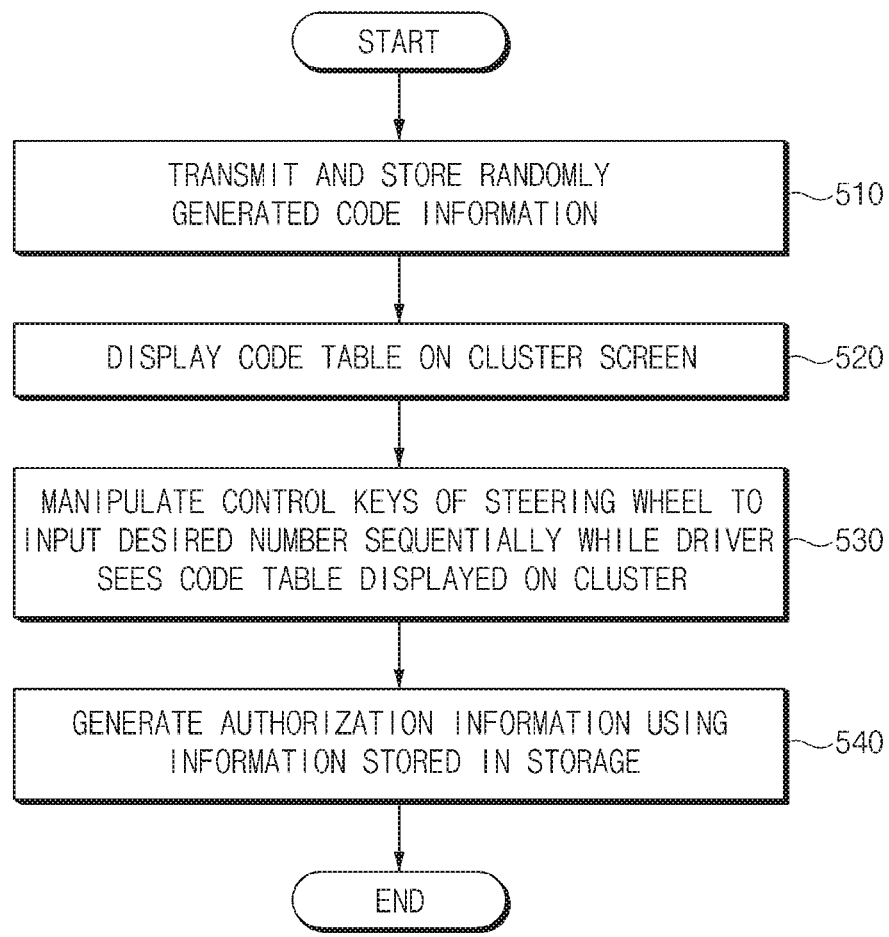
FIG. 5 is a flowchart illustrating a method for generating authorization information using an in-vehicle payment system of FIG. 2.

FIG. 5 is a flowchart illustrating a method for generating authorization information using an in-vehicle payment system of FIG. 2.

For example, when the vehicle enters a paid parking lot, the system 200 of the parking lot may recognize a license plate of the vehicle, and then transmit, to the in-vehicle payment system 100, entered vehicle information including information about the recognized vehicle and information about a parking fee.

When the user starts the vehicle after parking the vehicle for a certain time, the in-vehicle payment system 100 may request a payment to the system 200 of the parking lot. In response, the system 200 of the parking lot may transmit information about a parking time of the corresponding vehicle and a parking fee based on the parking time to the in-vehicle payment system 100.

The in-vehicle payment system 100 may pop up a payment screen containing the information about the parking time and the parking fee on an AUNT screen, and activate the authentication mode that requests the user to input the authentication number.

When activating the authentication mode, the authorization information generator 130 of the in-vehicle payment system 100 randomly generates the code information, then transmits the corresponding code information to the code display device 120, and then stores the code information in the storage 140 (S510).

For this purpose, the authorization information generator 130 may generate, in an arbitrary order, seven code values, each of which representing one number of 1 to 7, and transmits the seven code values to the code display device 120. Then, the authorization information generator 130 may match the corresponding code values with the elements in the code table in the 2×4 matrix form respectively, and store the matched code values in the storage 140.

For example, the authorization information generator 130 generates the code values in an order of 2, 5, 7, 6, 4, 1, 3, and transmits the code values to the code display device 120. Further, the authorization information generator 130 matches the code values of 2, 5, 7, 6, 4, 1, and 3 with the elements (1,1), (2,1), (1,2), (2,2), (1,3), (1,4), and (2,4) respectively, and stores the matched code values. The element (2,3) is locked, so that the element (2,3) does not match the code value.

The code display device 120 received the code information from the authorization information generator 130 generates the code table using the code values included in the code information, and then displays the code table on the screen of the cluster (S520).

For example, as shown in FIG. 4, the code display device 120 generates the code table in the form of 2×4 matrix respectively matching the code values of 2, 5, 7, 6, 4, 1, and 3 with the elements (1,1), (2,1), (1,2), (2,2), (1,3), (1,4), and (2,4), and then display the corresponding code table on the central portion of the cluster screen. In the present embodiment, because the element (2,3) is locked in the code table, the code value is not displayed.

When the code table is displayed on the screen of the cluster, the user sees the code table, and manipulates control keys of the steering wheel corresponding to a number the user wants to input in the code table sequentially (S530).

When assuming the authentication number to be input is "1234", the user identifies which element's code value each of numbers "1", "2", "3", and "4" in the code table is, and then manipulates control keys corresponding to the corresponding elements.

For example, in the code table in FIG. 4, the number "1" is the code value of the element (1,4), so that the user manipulates the cruise control key upwardly. Subsequently, the number "2" is the code value of element (1,1) in the code table, so that the user manipulates the volume control key upwardly. Similarly, because the "3" and the "4" are the code values of the elements (2,4) and (1,3), respectively, the user manipulates the cruise control key downwardly and then manipulates the UI control key upwardly.

The steering wheel 110 sequentially generates key signals respectively corresponding to the elements (1,4), (1,1), (2,4), and (1,3) by the manipulation of the control keys of the user, and transmits the generated key signals to the authorization information generator 130. For example, the steering wheel 110 may sequentially generate the seventh key signal 7, the first key signal 1, the eighth key signal 8, and the fifth key signal 5, and transmits the generated key signals to the authorization information generator 130.

When the key signals are received from the steering wheel 110, the authorization information generator 130 compares the corresponding key signals with the information stored in the storage 140 and recognizes what is the authentication number input by the user, and then generates authorization information corresponding to the input authentication number (S540).

For example, in the storage 140, the code information such as the code table displayed on the code display device 120 is stored, and the matching information about which element in the code table corresponds to each key signal received from the steering wheel 110 is stored.

Accordingly, the authorization information generator 130 may use the matching information stored in the storage 140 to identify that the seventh key signal 7, the first key signal 1, the eighth key signal 8, and the fifth key signal 5 received from the steering wheel 110 are respectively correspond to the elements (1,4), (1,1), (2,4), and (1,3) in the code table.

Subsequently, the authorization information generator 130 may use the code information stored in the storage 140 to identify the code values respectively corresponding to the elements (1, 4), (1, 1), (2, 4), and (1, 3), thereby recognizing the authentication number input by the user.

The authorization information generator 130 may request the authentication by transmitting the authorization information to the financial company server 300 using wireless communication means (not shown).

In the above-described embodiment, a case in which the authentication number is input using the control keys formed on the steering wheel has been described as an example, but the present disclosure is not limited thereto. For example, in addition to the control keys formed on the steering wheel, any interface in the vehicle that may be manipulated (input) by the user is available.

The description above is merely illustrative of the technical idea of the present disclosure, and various modifications and changes may be made by those skilled in the art without departing from the essential characteristics of the present disclosure.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The embodiment of the present disclosure may prevent the number input by the user from being easily exposed to a passenger when the user pays the charge for the product or the service in the vehicle.

In addition, the embodiment of the present disclosure allows the user to easily input the authentication number without stretching a hand to the AUNT screen.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An in-vehicle payment system comprising:
an authentication number input device including an interface of a vehicle configured to:
receive an input from a user; and
generate and output input signals corresponding to a manipulation pattern of the interface;
a code display device configured to display a code table in an array form including a plurality of code values based on code information on a screen; and
an authorization information generation device configured to:
generate the code information and transmit the code information to the code display device; and
recognize an authentication number input by the user using the code information and preset matching information to generate authorization information corresponding to an authentication number when the input signals are received from the authentication number input device,
wherein the authentication number input device includes:
a plurality of control keys formed on a steering wheel of the vehicle, and
wherein the plurality of control keys includes a volume control key for controlling a volume, a moving control key for changing broadcast channels/songs/files while using an AV (Audio/Video) function, a User Interface (UI) control key for setting a cluster screen mode, and a cruise control key for controlling a cruise speed.

2. The in-vehicle payment system of claim 1, wherein the authorization information generation device is configured to:
randomly change and transmit the code values included in the code information when transmitting the code information to the code display device.

3. The in-vehicle payment system of claim 1, wherein the plurality of control keys includes:
control keys arranged in a row on the steering wheel and respectively manipulated in a vertical direction.

4. The in-vehicle payment system of claim 3, wherein the authorization information generation device is configured to:
recognize a code value of a first element (1,1) in the code table in a matrix form as a number input by the user when a first input signal is received, wherein the first input signal is generated when a first control key located leftmost is manipulated upwardly;
recognize a code value of a second element (2,1) in the code table as a number input by the user when a second input signal is received, wherein the second input signal is generated when the first control key is manipulated downwardly;
recognize a code value of a third element (1,2) in the code table as a number input by the user when a third input signal is received, wherein the third input signal is generated when a second control key located immediately right to the first control key is manipulated upwardly; and
recognize a code value of a fourth element (2,2) in the code table as a number input by the user when a fourth input signal is received, wherein the fourth input signal is generated when the second control key is manipulated downwardly.

5. The in-vehicle payment system of claim 4, wherein the authorization information generation device is configured to:
recognize a code value of a fifth element (1,3) in the code table as a number input by the user when a fifth input signal is received, wherein the fifth input signal is generated when a third control key located immediately right to the second control key is manipulated upwardly;
recognize a code value of an sixth element (2,3) in the code table as a number input by the user when a sixth input signal is received, wherein the sixth input signal is generated when the third control key is manipulated downwardly;
recognize a code value of a seventh element (1,4) in the code table as a number input by the user when a seventh input signal is received, wherein the seventh input signal is generated when a fourth control key located immediately right to the third control key is manipulated upwardly; and
recognize a code value of an eighth element (2,4) in the code table as a number input by the user when an eighth input signal is received, wherein the eighth input signal is generated when the fourth control key is manipulated downwardly.

6. The in-vehicle payment system of claim 5, wherein the matching information includes information indicating a connection relationship between the input signals and the elements in the code table, and wherein the code information is information indicating which code value each element in the code table has.

7. The in-vehicle payment system of claim 5, wherein the first and second control keys are symmetrically arranged with the third and fourth control keys around a central portion of the steering wheel.

8. The in-vehicle payment system of claim 1, wherein the code display device is configured to display the code table on a cluster screen of the vehicle.

9. A method for generating authorization information of a vehicle, the method comprising:

displaying a code table in an array form including a plurality of code values on a screen;

when an interface of the vehicle receiving an input from a user is manipulated, generating input signals corresponding to a manipulation pattern of the corresponding interface; and finding code values respectively corresponding to the input signals using previously stored code information and matching information to recognize the corresponding code values as an authentication number input by the user, and wherein the interface includes a plurality of control keys formed on a steering wheel of the vehicle, and wherein the plurality of control keys includes a volume control key for controlling a volume, a moving control key for changing broadcast channels/songs/files while using an AV (Audio/Video) function, a User Interface (UI) control key for setting a cluster screen mode, and a cruise control key for controlling a cruise speed.

10. The method of claim 9, wherein the matching information includes information indicating a connection relationship between the input signals and elements in the code table, and wherein the code information is information indicating which code value each element in the code table has.

11. The method of claim 9, wherein the displaying of the code table on the screen includes:

displaying the code table on a cluster screen of the vehicle.

12. The method of claim 9, wherein the displaying of the code table on the screen includes:

randomly changing the code values respectively marked in elements in the code table.

13. The method of claim 9, wherein the generating of the input signals includes:

generating a first input signal when a first control key of the plurality of control keys formed on the steering wheel is manipulated upwardly;

generating a second input signal when the first control key is manipulated downwardly;

generating a third input signal when a second control key is manipulated upwardly;

generating a fourth input signal when the second control key is manipulated downwardly;

generating a fifth input signal when a third control key is manipulated upwardly;

generating a sixth input signal when the third control key is manipulated downwardly;

generating a seventh input signal when a fourth control key is manipulated upwardly; and generating an eighth input signal when the fourth control key is manipulated downwardly.

14. The method of claim 13, wherein the recognizing of the code values as an authentication number includes:

recognizing code values of elements (1,1), (2,1), (1,2), (2,2), (1,3), (2,3), (1,4), and (2,4) in the code table in a matrix form as the authentication number for the first to eighth input signals when the first to eighth input signals are generated.

\* \* \* \* \*